April 17, 1934.  C. J. CRANE ET AL  1,955,488
AERIAL FLIGHT INSTRUMENT
Filed Feb. 16, 1931  2 Sheets-Sheet 1

INVENTORS.
Carl J. Crane
William C. Ocker
BY Lancaster, Allwine and Rommel
ATTORNEYS.

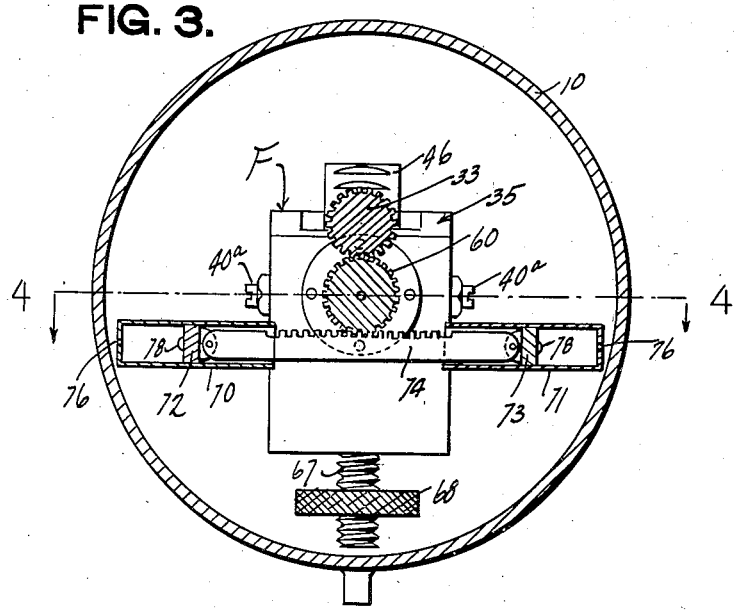
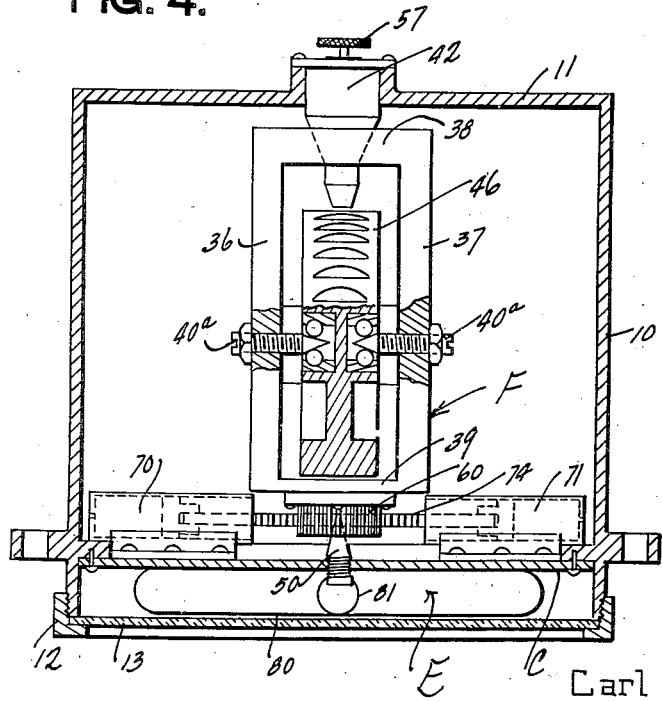

Patented Apr. 17, 1934

1,955,488

UNITED STATES PATENT OFFICE 1,955,488

AERIAL FLIGHT INSTRUMENT

Carl J. Crane and William C. Ocker, Brooks Field, Tex.

Application February 16, 1931, Serial No. 516,244

4 Claims. (Cl. 33—204)

This invention relates to improvements in instruments particularly well adapted to facilitate "blind" aerial flight.

A further object of this invention is the provision of an improved instrument to facilitate aircraft flight, which is relatively simple in construction, compact, and which will require but little interpretative effort upon the part of the pilot to fly normally through fog or under conditions which render external visual reference impossible.

A further object of this invention is the provision of an improved instrument adapted for use upon aircraft for the purpose of facilitating instrument flight, which is an improvement upon the instruments set forth in our U. S. applications Serial Nos. 474,540 and 494,131, respectively filed Aug. 11, 1930 and November 7, 1930; the present instrument being relatively simple, and embodying an improved indicator which is both gravity and gyroscopically controlled in an efficient, well balanced relation, and which permits of the enclosure of all of the parts within a single housing.

A further object of this invention is the provision of an improved aerial flight instrument which embodies an improved indicator operable for the purpose of determining turn of an aircraft, which is associated in close visual relation with a gravity inclinometer in such manner that the pilot may instantly and with little interpretative effort determine the quality of turn of the aircraft.

Other objects and advantages of this invention will be apparent during the course of the following detailed description.

In the accompanying drawings, forming a part of this specification, and wherein similar reference characters designate corresponding parts throughout the several views, Figure 1 is a front elevation of the improved instrument, showing the improved dial face thereof in relation to gyroscopic and gravity controlled indicia.

Figure 3 is a transverse sectional view taken substantially on the line 3—3 of Figure 2, and showing more particularly the operative connection between the precessing frame of a gyroscope and the indicator which it operates, as well as the damping means therefor.

Figure 4 is a horizontal sectional view taken substantially on the line 4—4 of Figure 3.

Figure 1:
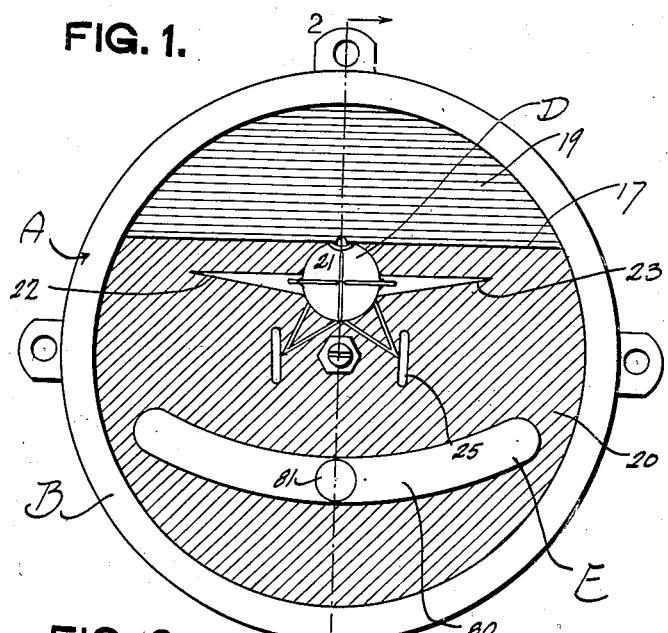

In the drawings, wherein for the purpose of illustration is shown only a preferred embodiment of the invention, the letter A may designate the improved flight instrument. It includes a casing or supporting frame B, which may be mounted upon the instrument board or in other convenient location upon the aircraft. It supports an improved dial C which may be considered part of the housing B if desired, and which has a suitable face delineated for cooperation with the indicator to be subsequently described. In the same field of view as the dial, that is, at the front thereof, there is provided an improved indicator D which is suitably controlled by combination gravity and gyroscopic controlling means F. Associated in visual relation with the indicator D there is provided an inclinometer E.

The housing or casing B is preferably of hollow cylindrical formation, comprising a cylindrical body 10, having a rear wall 11. The housing body 10 at the front is provided with a preferably detachable ring 12 by means of which a transparent glass plate 13 may be affixed over the front of the housing for protecting the instrument parts therein. Within the body 10 of the housing there is provided an annular attaching flange 14 spaced from the glass closure 13, to which the dial C, which is of disc-shaped formation, may be attached as at 15. The dial C is preferably opaque, and the face thereof is provided with a fixed and distinct horizon line 17 well above the center of the dial or disc. The space 19 on the face of the dial above the horizon 17 is suitably tinted, as with blue, to designate sky view, and the space 20 on the face of the dial below the horizon 17 is suitably colored darkly, as with a hue, in some color in well contrasted relation with the tint in the space 19. The horizon 17 and the colorings in the spaces 19 and 20 are adapted to designate in a simple manner the normal view of a pilot during aircraft flight, of the horizon, the sky and the earth beneath. The coloring in the space 19 may be a tint of blue, as above mentioned, and the coloring in the space 20 may be a hue of brown or black, or any other tint or hue of a color which will appropriately contrast with the coloring in the space 19 to give the desired effect.

Figure 2:
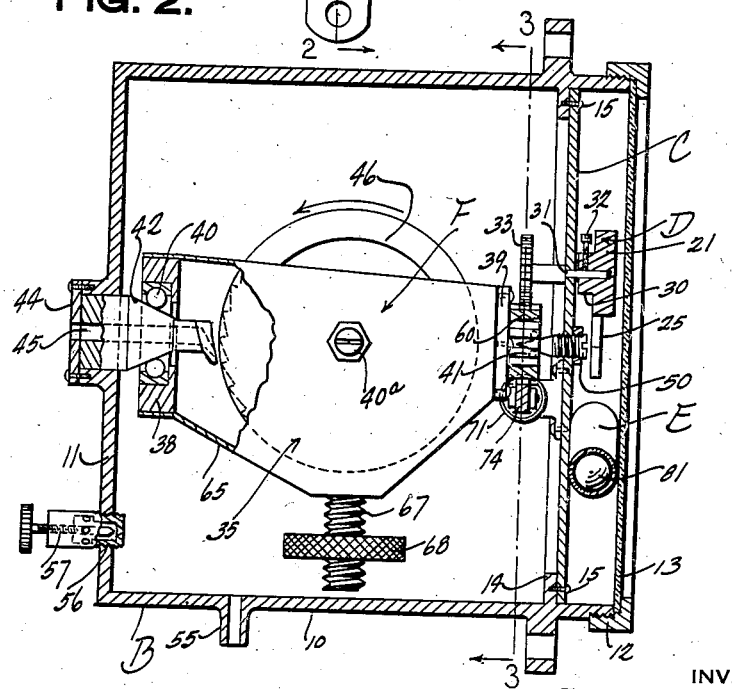
Figure 2 is a vertical sectional view taken through the improved instrument substantially on the line 2—2 of Figure 1.

The indicator D in the present instance represents the rear view of a low wing monoplane in flight, and consists of a disc body portion 21, having the diametrically opposed horizontal wing bar extensions 22 and 23. Across the body disc 21 there may be placed lines or devices representative of the empennage structure of the aircraft, and suitable depending structure 25 may designate the landing gear. The indicator D is preferably provided at the center of its body disc 21 with a rearwardly extending hub 30, shown in Figure 2 of the drawings, which is apertured or provided with a socket for receiving a pivot shaft 31, which bears on the dial C, as shown in Figure 2, at a location below the horizon line 17 and in such relation that the wing bars 22 and 23 lie in close spaced relation below the artificial horizon 17. The shaft 31 is extended through the dial C and detachably clamped by a set screw 32 with the indicator D. Rearwardly of the dial C the shaft 31 is enlarged and provided with a pinion or gear wheel 33 operatively controlled by the gyroscopic and gravity controlling means F.

The gyroscope of the means F includes a precessing frame 35 which consists of side walls 36 and 37 and end walls 38 and 39. The end walls 38 and 39 are provided with anti-friction bearings 40 and 41 respectively therein. The rear wall 11 of the housing B is provided with a tapered stub spindle 42, preferably centrally thereon, which extends into the anti-friction bearing 40 for oscillatively supporting the precessing frame 35. This stub spindle 42 is held by means 44 on the rear wall 11, and it is provided with a central opening 45 for discharge of air or fluid into the precessing frame for rotating the gyroscopic wheel 46 which is rotatably supported by the side walls 36 and 37 at 40a. The dial C, which may be part of the frame, is provided with an adjustable tapered screw or supporting spindle 50 upon which the bearing 41 rests for supporting the other end of the precessing frame 35.

The gyroscopic rotor wheel 46 is rotatably supported on an axis normal to the axis on which the frame 35 precesses. This wheel is peripherally provided with teeth or grooves sloped in such relation that the fluid jet entering the housing from the passageway 45 will rotate the rotor wheel 46 in the direction shown.

The housing B is provided with a suitable nipple 55 to which means may be attached for withdrawing air from the housing, so that the jet will be directed against the wheel 46, as is quite obvious. The housing in its rear wall is preferably provided with an opening 56 wherein a manually adjustable needle valve device 57 is mounted to bleed air into the shell or housing B in order to control the speed of the rotor wheel 46, as will be quite apparent.

The gyroscope at its bearing upon the dial C is provided with a gear wheel or pinion 60 which meshes with the pinion 33 of the indicator D for the purpose of operating the latter upon precessing of the gyroscope frame.

While our co-pending application above mentioned shows a combination gyroscope and gravity operated indicator for aerial flight instruments, yet the present arrangement contemplates a better balanced structure, and one which will admit of the efficient placement of the gyroscope and indicator and actuating mechanism in a single housing so as not to interfere with the proper flow of the jet stream to the rotor wheel. To this end, the precessing frame 35 is provided with a bottom wall or sump 65 suitably shaped to lie beneath the rotor wheel 46, and on the lower portion thereof is provided a depending screw threaded shank 67 whereon an adjustable nut 68 is threaded; the screw threaded shank 67 and nut 68 being properly weighted and constituting a pendulum for the precessing frame 35. The axis of the shank 67 is arranged normal to the axis of the rotor wheel 46 and the pendulum is so placed that the axis of the shank 67 intersects the central plane of the rotor wheel 46. Thus, the pendulum is positioned in a balanced relation not only fore and aft of the precessing frame, but also laterally with respect thereto. This obviates any eccentric forces upon the actuating and movable parts of the gyroscope, and particularly the precessing frame thereof.

An improved damping means is provided for the gyroscope. It consists of cylinders 70 and 71 mounted upon the rear or gyroscope side of the dial C, in horizontal alignment, wherein pistons 72 and 73 respectively slide. These pistons are pivotally connected together by means of a bar-like rack 74 which has a series of teeth 75 thereon meshing with the lower side of the gear 60. The ends of the cylinders 70 and 71 may have vent openings 76 therein, sufficiently small as not to interfere with proper damping action. The faces of the pistons have resilient bumpers 78 thereon, which may engage against the end walls of the cylinders to limit the oscillation of the precessing frame through a total arc of substantially 180° from one side to the opposite side.

A gravity inclinometer E is positioned in a cooperative visual relation upon the casing B, preferably between the dial or disc C and the closure glass 13. It may be mounted in any approved manner, and preferably consists of a transparent glass tube 80 filled with some damping fluid, and wherein a steel ball 81 is positioned for free movement. This gravity inclinometer in lieu of the ball type may be of the bubble or pendulum type. It is placed in close visual relation below the indicator D so that the pilot may interpret the position of the ball 81 with respect to the indicator D with little visual effort.

From the foregoing it will readily be apparent that the wing indicator D will tilt as a result of a bank of the aircraft during a turn. This tilting of the indicator is made in exact angular relation with respect to the degree of bank of the aircraft wing upon which the instrument is used. It is quite apparent from the gearing connection that a left wing bank of the airplane will cause a lowering of the left wing portion of the indicator D.

Due to the gravity actuated pendulum upon the gyroscope, if the aircraft wing is dropped or lowered as in a side slip, the resultant gravitational force will cause the pendulum of the precessing frame to be moved in such manner as to swing the indicator D. If this side slip due to dropping of the wing is made while the aircraft is pursuing a straight course, and not during a turn, it is apparent that there will be no gyroscopic actuation of the indicator D.

The indicator D moves responsive to the combined force of gravity and gyroscopic force, as will be quite apparent.

It will be understood that due to the close association of the inclinometer E and the index or indicator D, the pilot will be in a position to visually interpret quickly and with little effort the quality of the turn of the aircraft. If the aircraft is properly banked during a turn centrifugal force will hold the ball 81 in central position and the indicator D will designate the direction and the angular degree to which the wings of the aircraft are positioned relative to the horizon. Any side slip of the wings during banking will be indicated upon the inclinometer E, and the relation of this inclinometer to the indicator D will quite accurately give the pilot the position of the aircraft and the quality of the turn made thereby.

Various changes in the shape, size, and arrangement of parts may be made to the form of invention herein shown and described, without departing from the spirit of the invention or the scope of the claims.

We claim:

1. In an aerial flight instrument the combination of a supporting frame structure, an elongated wing-like indicator pivoted between its ends, gyroscopic means having a precessing frame to which the indicator is connected so that the latter is horizontal during level flight but will tilt relative to the frame upon banking and turning of an aircraft, and means fixed with the supporting frame structure forming a background for said indicator contrasting with the indicator and provided with a fixed horizon delineated thereon with the space above the horizon tinted in designation of the sky view seen by an aviator during flight and the space below the artificial horizon contrastingly designating the general coloring of the earth as seen by an aviator during flight.

2. In an aerial flight instrument the combination of a supporting frame structure, a movable indicator simulating the rear view of a low wing monoplane in flight, means mounting the indicator upon the frame structure for tilting movement, a gyroscope carried by the frame structure including a precessing frame operatively connected with the indicator for moving the latter as the gyroscope precesses upon turn of an aircraft to which the instrument is attached, and a background for the indicator having a fixed horizon thereon in co-related visual cooperation with the indicator, the background above the horizon and the background below the horizon being contrastingly colored.

3. In an instrument of the class described the combination of a supporting housing, a gyroscope operatively supported by the housing including a precessing frame, a first gear carried by the precessing frame axially of the axis of movement of the precessing frame, an indicator, a second gear meshing with the first gear and carrying said indicator, damping cylinders at opposite sides of one of said gears, pistons in said cylinders, and a rack connecting said pistons and meshing with one of said gears for damping the action of the precessing frame.

4. In an instrument of the class described the combination of a supporting housing, a gyroscope operatively supported by the housing including a precessing frame, a gear carried by the precessing frame axially of the axis of movement of the precessing frame, damping cylinders at opposite sides of the gear, pistons in said cylinders, a rack connecting said pistons and meshing with the gear for damping the action of the precessing frame, an indicator, and means operatively connecting the indicator with said gear for determining the degree of movement of the precessing frame.

CARL J. CRANE.
WILLIAM C. OCKER.